United States Patent [19]

Schirmer

[11] 3,939,653

[45] Feb. 24, 1976

[54] GAS TURBINE COMBUSTORS AND METHOD OF OPERATION

[75] Inventor: Robert M. Schirmer, Bartlesville, Okla.

[73] Assignee: Phillips Petroleum Company, Bartlesville, Okla.

[22] Filed: Mar. 29, 1974

[21] Appl. No.: 456,180

[52] U.S. Cl............................ 60/39.65; 60/39.66
[51] Int. Cl.².......................................... F02C 3/00
[58] Field of Search ........... 60/39.65, 39.23; 431/10

[56] References Cited
UNITED STATES PATENTS

| | | | |
|---|---|---|---|
| 2,616,257 | 11/1952 | Mock................................ | 60/39.65 |
| 2,958,194 | 11/1960 | Bayley.............................. | 60/39.65 |
| 3,283,502 | 11/1966 | Lefebvre........................... | 60/39.65 |
| 3,705,492 | 1/1971 | Vickers............................ | 60/39.51 R |
| 3,736,747 | 6/1973 | Warren............................. | 60/39.65 |
| 3,826,077 | 7/1974 | Quigg et al. .................... | 60/39.65 X |
| 3,826,078 | 7/1974 | Quigg.............................. | 60/39.02 |

*Primary Examiner*—C. J. Husar
*Assistant Examiner*—Thomas I. Ross

[57] ABSTRACT

New combustors, and methods of operating same, which produce lower emissions, particularly lower emissions of nitrogen oxides. Methods and means are provided for supplying separate streams of air to primary and secondary combustion zones of a combustor, for removing heat from said primary combustion zone, and reintroducing said heat into the combustor at a region spaced apart and downstream from said primary and secondary combustion zones.

15 Claims, 9 Drawing Figures

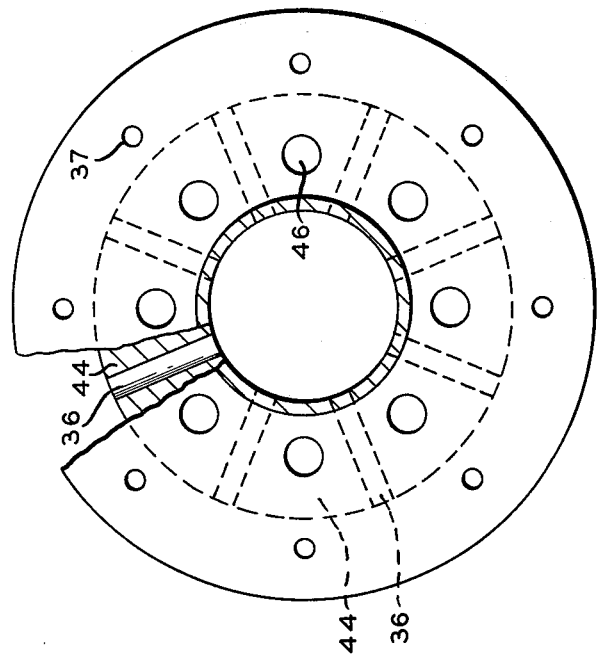
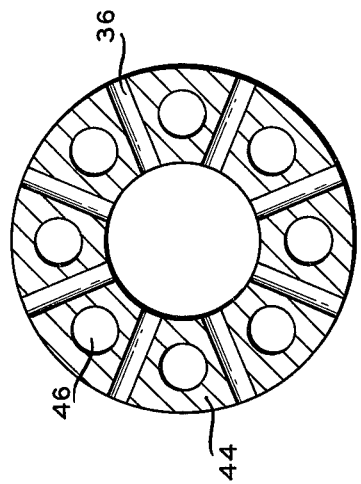
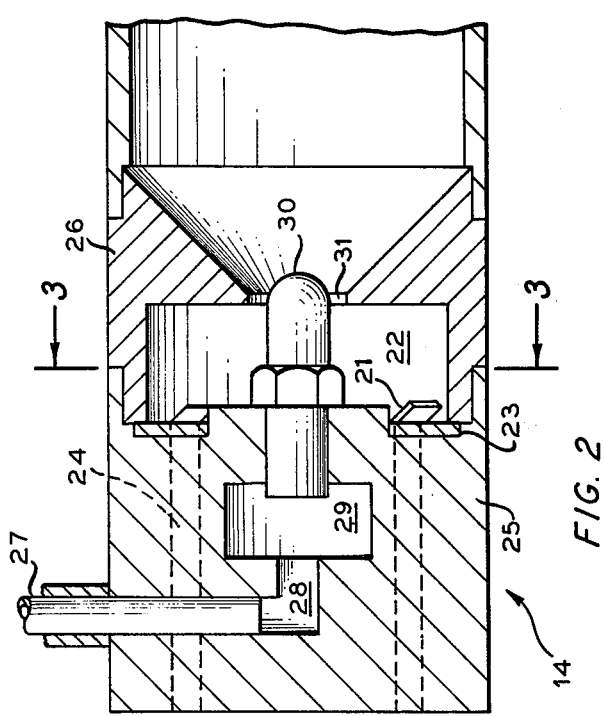
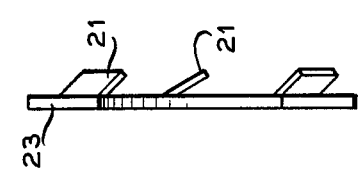
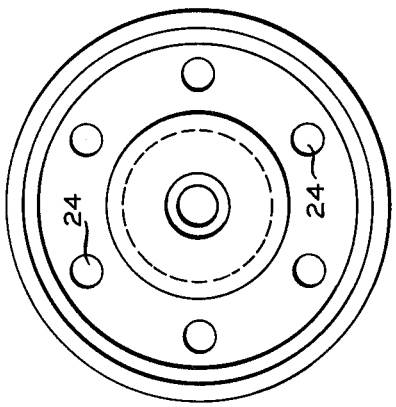

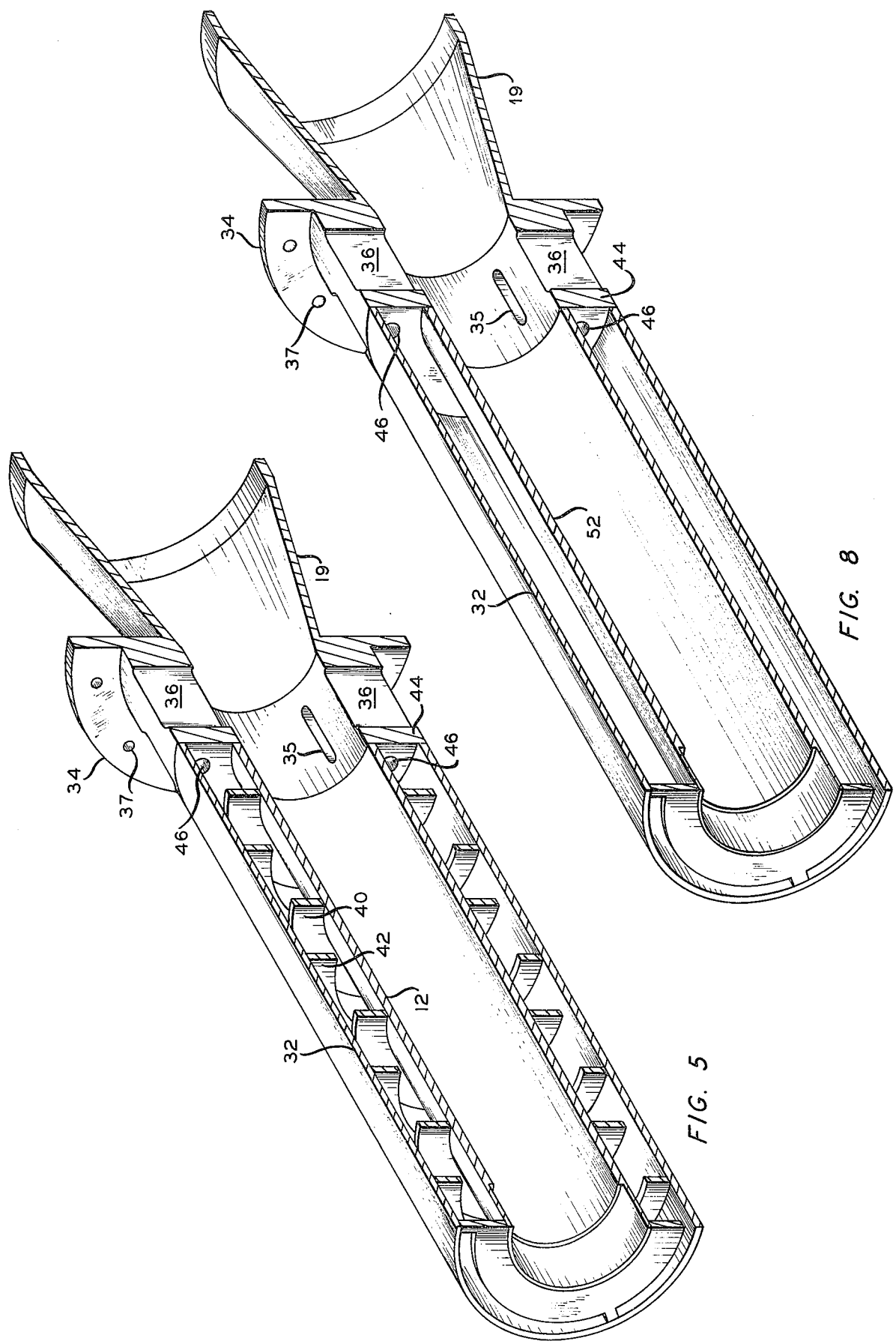

GAS TURBINE COMBUSTORS AND METHOD OF OPERATION

This invention relates to improved combustors and methods of operating same.

Air pollution has become a major problem in the United States and other highly industrialized countries of the world. Consequently, the control and/or reduction of said pollution has become the object of major research and development effort by both governmental and nongovernmental agencies. Combustion of fossil fuel is a primary source of said pollution. It has been alleged, and there is supporting evidence, that automobiles employing conventional piston-type engines burning hydrocarbon fuels are a major contributor to said pollution. Vehicle emission standards have been set by the United States Environmental Protection Agency which are sufficiently restrictive to cause automobile manufacturers to consider employing alternate engines instead of the conventional piston engine.

The gas turbine engine is being given serious consideration as an alternate engine. CO emissions in conventional prior art gas turbine combustors operated for maximum fuel combustion efficiency are not usually a problem. However, nitrogen oxides emissions, usually referred to as $NO_x$, are a problem because the high temperatures generated in such prior art processes favor the production of $NO_x$. It has been proposed to reduce the temperature of the inlet combustion air flowing to the combustion apparatus so as to reduce the amount of nitrogen oxide produced. For example, see the U.S. Pat. No. 3,705,492, to Vickers, issued Dec. 12, 1972. However, there is no disclosure in said Vickers patent of what happens to the production of CO and hydrocarbon (HC) emissions.

There is a need for a combustor of practical and/or realistic design, and/or a combustion process, which can be operated in a manner such that the emissions therefrom will meet said standards. Even a combustor, and/or a process, giving reduced emissions approaching said standards would be a great advance in the art. Such a combustor, or process, would have great potential value because it is possible the presently very restrictive standards may be reduced.

The present invention solves the above-described problems by providing improved combustors, and methods of operating same, which produce emissions reasonably approaching the present stringent standards established by said environmental protection agencies. Said methods comprise preferably supplying separate streams of air to primary and secondary combustion zones of a combustor, removing heat from said primary combustion zone, and reintroducing said heat into the combustor at a region spaced apart from and downstream from said primary and secondary zones. In preferred embodiments the temperature of the inlet air to the primary combustion zone is reduced.

Thus, according to the invention, there is provided a combustor, comprising, in combination: an outer casing; a flame tube disposed within said casing and spaced apart therefrom to form a first annular chamber between said flame tube and said casing; an air inlet means for introducing a first stream of air into the upstream end portion of said flame tube; a fuel inlet means for introducing fuel into the upstream end portion of said flame tube; an imperforate sleeve surrounding an upstream portion of said flame tube and spaced apart therefrom to longitudinally enclose an upstream portion of said first annular chamber and define a second annular chamber between said sleeve and said outer casing; a wall member secured to said outer casing and substantially closing the downstream end of said second annular chamber; at least one opening provided in the wall of said flame tube at a first station located intermediate the upstream and downstream ends thereof; first conduit means extending from said second annular chamber into communication with said opening located at said first station for admitting a second stream of air from said second annular chamber into the interior of said flame tube; at least one other opening provided in the wall of said flame tube at a second location located downstream from said first station for admitting a third stream of air from said first annular chamber into the interior of said flame tube; and at least one opening provided in said wall member for providing communication between said second annular chamber and the portion of said first annular chamber downstream therefrom.

Further, according to the invention, there is provided a method for burning a fuel in a combustor, which method comprises: introducing a first stream of air into a primary combustion zone of said combustor; introducing a fuel into said primary combustion zone; burning said fuel; introducing a portion of a second stream of air, maintained separate from said first stream of air, into a second zone of said combustor located downstream from said primary combustion zone; passing a third stream of air, maintained separate from said first and second streams of air, in a downstream direction over and in heat exchange with an outer wall of said primary combustion zone so as to remove heat from the interior of said primary combustion zone and heat said air; introducing said thus-heated third stream of air into a third zone of said combustor located downstream from said second zone; and combining another portion of said second stream of air with said heated third stream of air for introduction into said third zone.

FIG. 2 is an enlarged view in cross section of the dome or closure member employed in the upstream end of the flame tube in the combustor of FIG. 1.

FIG. 3 is a cross section view taken along the line 3—3 of FIG. 2.

FIG. 3a is a sectional view of an element of the fuel and air intoduction means of FIG. 2.

FIG. 4 is a view in cross section along the line 4—4 of FIG. 1.

FIG. 5 is a perspective view, partially in cross section, of the upstream portion of the flame tube of the combustor of FIG. 1.

FIG. 7 is a cross section view taken along the lines 7—7 of FIG. 6.

FIG. 8 is a perspective view, partially in cross section, of the upstream portion of another type of flame tube which can be employed in the combustors of the invention.

Figure 1:
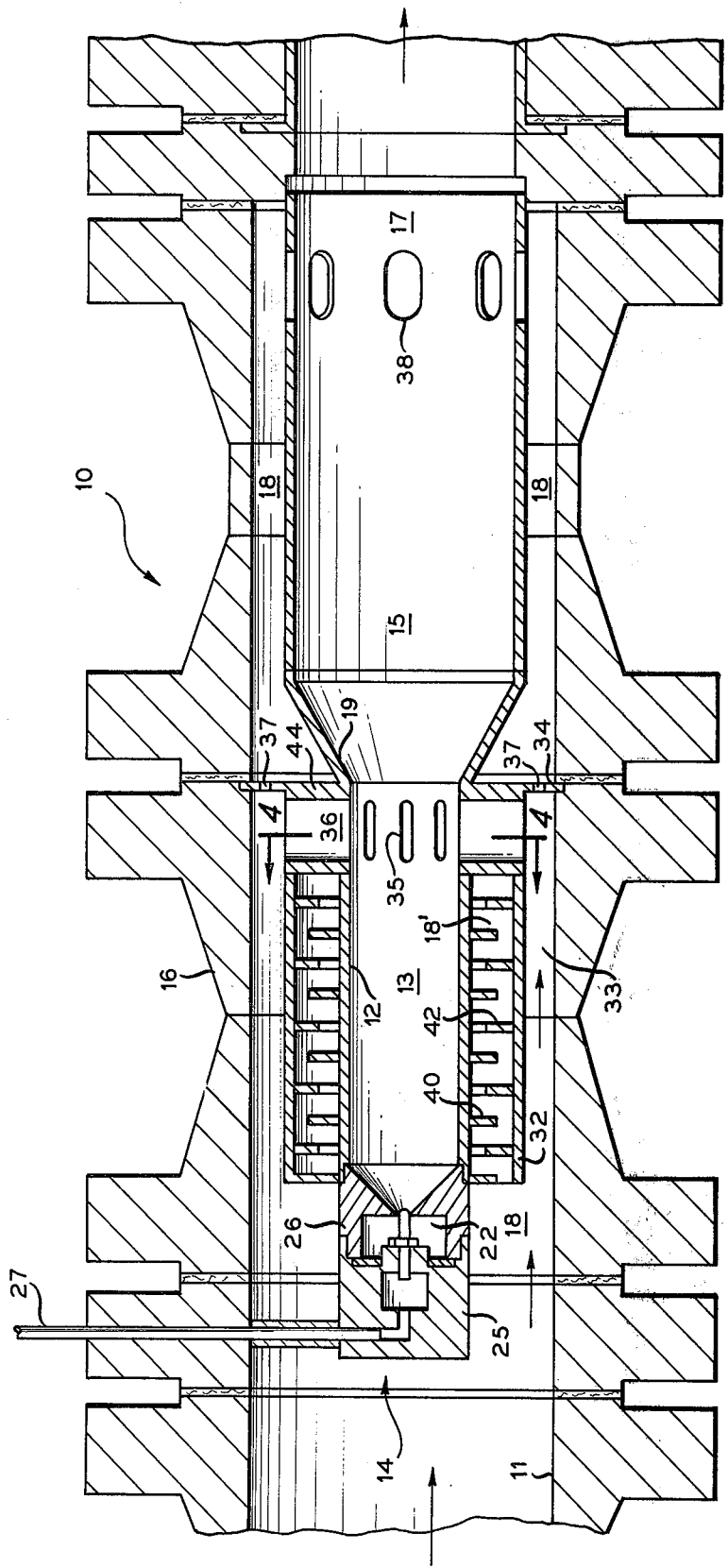
FIG. 1 is a view, in cross section, of a combustor in accordance with the invention.

Referring now to the drawings, wherein like reference numerals are employed to denote like elements, the invention will be more fully explained. In FIG. 1 there is illustrated a combustor in accordance with the invention, denoted generally by the reference numeral 10, which comprises an elongated flame tube 12. Said flame tube 12 is open at its downstream end, as shown, for communication with a conduit leading to a turbine or other utilization of the combustion gases. Said flame tube preferably comprises an upstream primary combustion region 13, an enlarged intermediate secondary combustion region 15, and a downstream quench region 17. Preferably, said secondary combustion region comprises an outwardly tapered connecting section 19 adjacent the upstream end thereof. Said connecting section 19 tapers in increasing cross-sectional area from the downstream end of said primary combustion section 13 to the upstream end of the enlarged portion of said secondary combustion section 15. A closure or dome member, designated generally by the reference numeral 14, is provided for closing the upstream end of said flame tube, except for the openings in said dome member. An outer housing or casing 16 is disposed concentrically around said flame tube 12 and spaced apart therefrom to form a first annular chamber 18 around said flame tube and said dome or closure member 14. Said annular chamber 18 is closed at its downstream end by any suitable means such as that illustrated. Suitable flange members, as illustrated, are provided at the downstream end of said flame tube 12 and outer housing 16 for mounting same and connecting same to a conduit leading to a turbine or other utilization of the combustion gases from the combustor. Similarly, suitable flange members are provided at the upstream end of said flame tube 12 and said outer housing 16 for mounting same and connecting same to a suitable conduit means which leads from a compressor or other source of air. As illustrated in the drawing, said upstream flange members comprise a portion of said outer housing or casing 16 which encloses dome member 14 and forms the upstream end portion of said first annular chamber 18. It will be understood that outer housing or casing 16 can be extended, if desired, to enclose dome 14 and said upstream flanges then relocated on the upstream end thereof. While not shown in the drawing, it will be understood that suitable support members are employed for supporting said flame tube 12 and said closure member 14 in the outer housing 16 and said flange members. Said supporting members have been omitted so as to simplify the drawing.

An air inlet means is provided for introducing a swirling mass or stream of air into the upstream end portion of flame tube 12. As illustrated in FIGS. 1, 2, 3, and 3a, said air inlet means comprises a generally cylindrical swirl chamber 22 formed in said dome or closure member 14. The downstream end of swirl chamber 22 is in open communication with the upstream end of flame tube 12. A plurality of air conduits 24 extend from the upstream face of dome member 14, and are in communication with conduit 11 or other suitable source of air, into swirl chamber 22. A swirl is imparted to said air by the angularly disposed baffles 21, one for each of said air conduits 24, which are formed on the downstream side of swirl plate 23 and are positioned adjacent the outlets of said air conduits 24. Said dome or closure member 14 can be fabricated integrally, i.e., as one element. However, in most instances it will be preferred to fabricate said closure member in a plurality of pieces, e.g., an upstream element 25, a swirl plate 23 (see FIG. 3a), and a downstream element or radiation shield 26.

A fuel inlet means is provided for introducing a stream of fuel into the upstream end of flame tube 12. As illustrated in FIGS. 1 and 2, said fuel inlet means comprises a fuel conduit 27 leading from a source of fuel, communicating with a passageway 28 formed in upstream element 25, which in turn communicates with chamber 29, also formed in element 25. A spray nozzle 30 is mounted in a suitable opening in the downstream side of said element 25 and is in communication with said chamber 29. Any other suitable type of spray nozzle and fuel inlet means can be employed, including other air assist atomization nozzle. For example, it is within the scope of the invention to employ other nozzle types for atomizing normally liquid fuels such as nozzles wherein a stream of air is passed through the nozzle along with the fuel.

It will be understood the combustors of the invention can be provided with any suitable type of ignition means and, if desired, means for introducing a pilot fuel to initiate burning. For example, a sparkplug (not shown) can be mounted to extend into flame tube 12 adjacent the downstream end of radiation shield 26.

A flared expansion passageway is formed in the downstream end portion of dome or closure member 14. Said flared passageway flares outwardly from the opening 31 in the downstream end of swirl chamber 22 to a point on the inner wall of flame tube 12.

An imperforate sleeve 32 surrounds an upstream portion of said flame tube 12. The outer wall of said sleeve 32 can be insulated if desired and thus increase its effectiveness as a heat shield. Said sleeve 32 is spaced apart from flame tube 12 so as to longitudinally enclose an upstream portion 18' of said first annular chamber 18 and define a second annular chamber 33 between said sleeve 32 and outer casing 16. An annular wall member 34, secured to the inner periphery of casing 16, is provided for substantially, i.e., at least partially, closing the downstream end of said second annular chamber 33. As here illustrated, said wall member 34 can be provided with a plurality of openings 37 therein for admitting a portion of the air stream in second annular chamber 33 into the downstream portion of first annular chamber 18 so as to decrease pressure drop through the combustor. At least one opening 35 is provided in the wall of flame tube 12 at a first station located intermediate the ends of said flame tube and at the end of said primary combustion section 13. In most instances, it will be preferred to provide a plurality of openings 35, as illustrated. A generally tubular conduit means 36 extends from said second annular chamber 33 into communication with said opening 35 for admitting a second stream of air from said second annular chamber 33 into the interior of flame tube 12. When a plurality of openings 35 are provided, a plurality of said tubular conduits 36 are also provided, with each individual conduit 36 being individually connected to an individual opening 35. The abovedescribed structure thus provides an imperforate conduit means comprising second annular chamber 33 and tubular conduit(s) 36 for admitting a second stream of air into the interior of flame tube 12.

At least one other opening 38 is provided in the wall of flame tube 12 at a second station located downstream and spaced apart from said first station for admitting a third stream of air from first annular chamber 18 into the interior of flame tube 12. In most instances, it will be preferred to provide a plurality of openings 38 spaced around the periphery of said flame tube, similarly as illustrated.

Preferably, the outer wall surface of flame tube 12 is provided with an extended surface in the form of fins or tabs 40 mounted thereon in the region surrounded by sleeve 32, and which extend into the portion 18' of said first annular chamber which is enclosed by said sleeve. As here illustrated, said fins or tabs 40 alternate with similar fins or tabs 42 which extend from the inner surface of sleeve 32. See FIG. 5. Said fins 40 and 42 can extend into closed position 18' any desired distance. Any other suitable type of fin structure, i.e., extended surface can be employed.

FIG. 4 illustrates one type of structure which can be employed to provide tubular conduits 36. A boss member 44 is provided around the outer periphery of flame tube 12 at the downstream end of sleeve 32 and said enclosed portion 18' of first annular chamber 33. Said tubular conduits 36 are drilled transversely through said boss member 44 to provide communication between second annular chamber 33 and the interior of flame tube 12. Longitudinal passageways 46 are drilled through said boss member 44 to provide communication between said enclosed portion 18' and the downstream portion of first annular chamber 18. Said tubular conduits 36 connect individually with individual openings 35 in flame tube 12.

Figure 6:
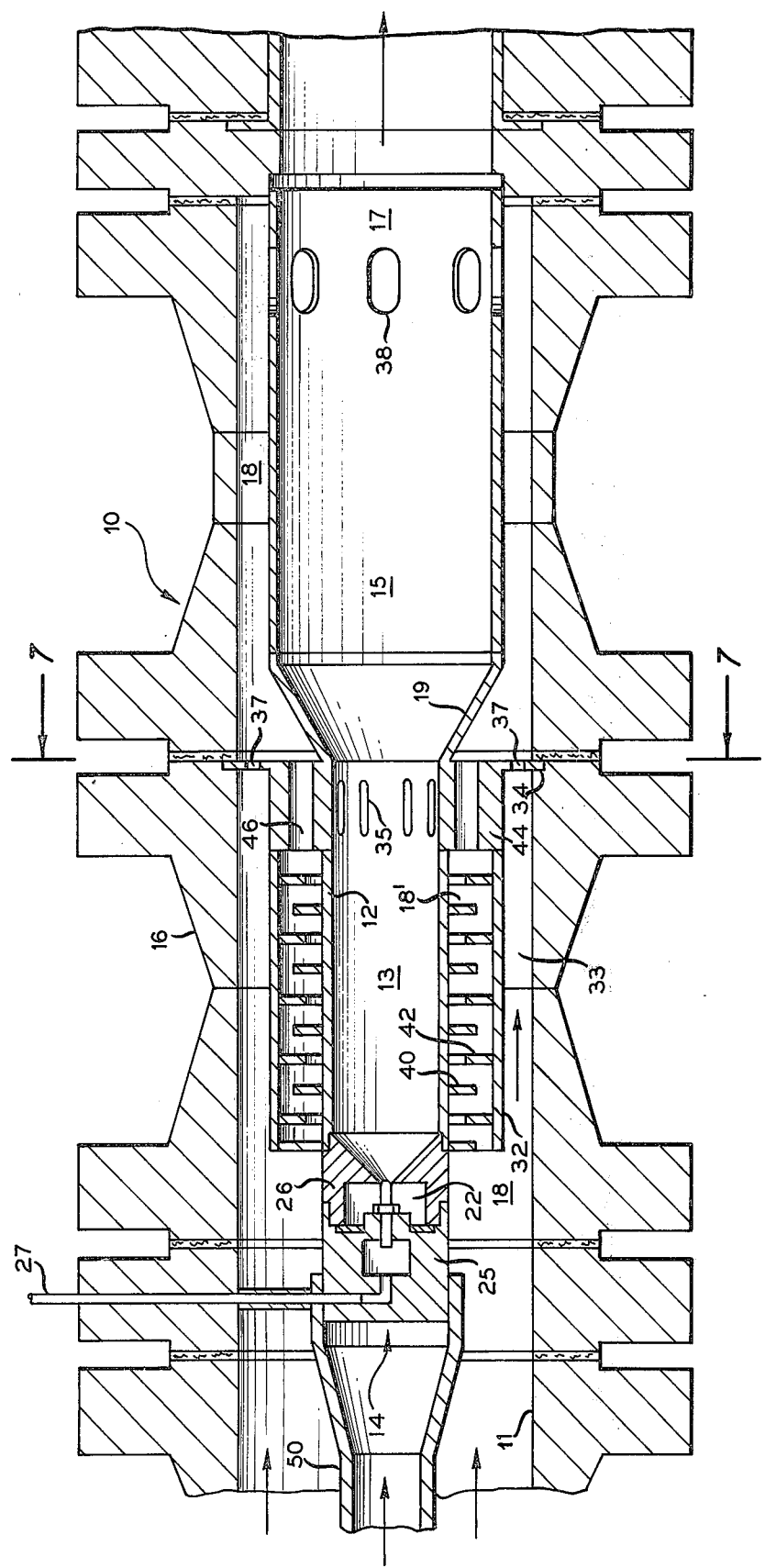
FIG. 6 is a view in cross section of another combustor in accordance with the invention.

FIG. 6 illustrates another combustor installation which can be employed in the practice of the invention. The combustor 10 in FIG. 6 is essentially like the combustor 10 in FIG. 1, but has been illustrated differently. For example, the cross section is taken differently in FIG. 6 so as to show the longitudinal passageways 46 which extend through boss member 44. Similarly, the view in FIG. 7 shows the relationship between wall member 34, boss member 44, tubular conduits 36, and said longitudinal passageways 46.

In FIG. 6, primary air inlet conduit 50 is connected to the upstream end of dome or closure member 14 for admitting unheated primary combustion air thereto and into the primary combustion region of the flame tube 12. In this installation, conduit 11 and conduit 50 are connected to different sources of air. Said conduit 11 supplies heated air to annular space 18 of the combustor and can be connected to any suitable source of heated air, e.g., a conduit from the regenerator or recuperator in a regenerative type engine where the air to the combustor is heat exchanged in a regenerator or recuperator with exhaust gases from the turbine. If desired, said air in conduit 11 can be heated by any other suitable means, e.g., a heater provided in the air stream from the compressor.

Primary air inlet conduit 50 can be connected to any suitable source of unheated air. In a regenerative type engine, said conduit 50 can be connected to a bypass conduit which bypasses a portion of the air from the compressor around the regenerator or recuperator. For example, see said Vickers U.S. Pat. No. 3,705,492. If desired, said conduit 50 can be connected to another compressor other than the compressor supplying air to conduit 11.

Referring now to FIG. 8, there is illustrated the upstream portion of another flame tube 52 which can be employed in the combustors of the invention. The downstream portion of said flame tube 52 is like the downstream portion of the flame tubes illustrated in FIGS. 1 and 6. It will be noted that the fins 40 and 42 have been omitted from the flame tube illustrated in FIG. 8.

In one method of operating the combustor of FIG. 1, a stream of air from a compressor and a heating means (not shown) is passed to the combustor via a conduit 11 connected to the flange at the upstream end of annular space 18. A first stream of said heated air is passed from said conduit 11 through conduit 24 in dome member 14 and into swirl chamber 22. Baffles 11 on swirl plate 23 impart a helical or swirling motion to the air entering said swirl chamber and exiting therefrom. This swirling motion creates a strong vortex action resulting in a reverse circulation of hot gases within flame tube 12. Said first stream of air comprises and can be referred to as primary combustion air.

A stream of fuel is admitted, via conduit 27 and nozzle 30, axially of said swirling stream of air. Controlled mixing of said fuel and said air occurs at the interface therebetween. The fuel, and the air from swirl chamber 22, are passed through the expansion passageway in radiation shield 26 wherein they are expanded in a uniform and graduated manner, during at least a portion of the mixing thereof, from the volume in the region of the initial contact therebetween to the volume of the primary combustion zone, i.e., the upstream portion of flame tube 12.

A second stream of air, maintained seprate from said first stream of air, is passed from the upstream end of annular chamber 18 via second annular chamber 33, tubular conduits 36, and openings 35 into a second zone of the combustor which is located downstream from said primary combustion zone. Said second stream of air comprises and can be referred to as secondary combustion air. Preferably, a major portion of the air stream in said second annular chamber 33 is utilized as said secondary air.

A third stream of air, maintained separate from said first and second streams of air, is passed from the upstream end of annular chamber 18, via the enclosed portion 18', through passageways 46 in boss member 44 into the downstream portion of annular chamber 18, and then via openings 38 into a third zone of the combustor which is located downstream from said second zone. Said third stream of air comprises and can be referred to as dilution or quench air. A portion of the air stream in said second annular chamber 33 is passed through openings 37 in wall member 34 and into the downstream portion of first annular chamber 18 where it is combined with said third stream of air for entry into said flame tube via openings 38. Preferably, said portion of air passed through said openings 37 is a minor portion of the air stream in said second annular chamber 33.

In the above method of operation, combustion of said fuel is initiated at least in said primary combustion zone with said first stream of air (primary air) and essentially completed, if necessary, in said second zone with said second stream of air. The resulting combustion gases are quenched in said third zone and the quenched gases exit the downstream end of the flame tube to a turbine or other utilization such as a furnace, boiler, etc. In the above method of operation, said third stream of air in flowing through enclosed portion 18' removes heat from the wall of the primary combustion zone, thus lowering its temperature, thereby increasing the heat loss from the combustion zone. Preferably, the outer wall of the primary combustion zone is provided with an extended surface, e.g., fins as shown in FIG. 1, so as to increase said heat removal from the primary combustion zone. The air which is heated by heat loss from the combustor wall is used only in the quench zone of the combustor, and the overall efficiency is maintained by the introduction of the heated air into said quench zone.

In the above methods of operation the relative volumes of said first, second, and third streams of air can be controlled by varying the sizes of the said openings, relative to each other, through which said streams of air are admitted to flame tube 12. Any other suitable method of controlling said air volumes can be employed. For example, flow meters or calibrated orifices can be employed in the conduits supplying said streams of air.

The operation of the combustor illustrated in FIG. 6 is substantially like that described above for the combustor of FIG. 1. The principal difference is that in the combustor of FIG. 6 the primary combustion air supplied via conduit 50 is unheated air, as previously described.

The following examples will serve to further illustrate the invention. In each of said examples a series of test runs was made to evaluate combustors of the invention over a range of operating conditions as set forth therein.

EXAMPLE I

Combustors 1 and 3 were run using heated air to the primary combustion zone at test conditions within the following schedule:

| Inlet Air Pressure in. Hg Abs. | Primary Zone Inlet Air Temp. °F. | Cold Flow Reference Velocity ft/sec | | |
|---|---|---|---|---|
| 130 | 1050 | — | 150 | 190 |
| 130 | 1150 | 110 | 150 | 190 |
| 130 | 1250 | — | — | 190 |

Runs were made at the above six test conditions by increasing heat input rates from 100 to 250 Btu/lb-of-air, in 50 Btu/lb increments, or until the calculated exhaust-gas temperature of approximately 2000° F. was reached. This produced a total of 18 test points or conditions. At each of said test 18 conditions the total air flow to the combustor was fixed at a value within the range of from 1.042 to 1.919 pounds per second, and the fuel flow was fixed at a value within the range of from 30.14 to 74.00 pounds per hour. The volume of air to the different zones of the combustors was calculated on the basis of open entry hole sizes to each zone. At each test condition, the exhaust gas from the combustor was analyzed to determine the concentration of $NO_x$, CO, and unburned hydrocarbons (HC). In general, in said analyses the SAE recommended procedure was followed, i.e., "Procedure for the Continuous Sampling and Measurement of Gaseous Emissions from Aircraft Turbine Engines", Society of Automotive Engineers, Inc., New York, Aerospace Recommended Practice 1256, (October 1971).

From the raw data thus obtained, the Emission Index (pounds of pollutant produced per 1000 pounds of fuel burned) was calculated for $NO_x$, CO, and HC. For the sake of brevity, test condition 18 was selected for reporting herein as being representative of severe conditions which favor maximum $NO_x$ production.

Operating conditions for said test condition 18 for combustor 3 were as follows: inlet air pressure, 130 in. Hg abs.; primary air inlet temperature, 1195° F.; temperature of secondary air, 1235° F.; temperature of quench air, 1320° F.; cold flow reference velocity, 190 feet per second; heat input, 200 Btu per pound of air; combustor outlet temperature (estimated), 1950° F.; total air flow, 1.694 pounds per second; and fuel flow, 65.33 pounds per hour. The only air temperature specifically measured in the operation of combustor 1 was the temperature of the air to the primary combustion zone, which was the temperature of the air from the air heater. This was controlled to be 1250° F. The other air stream temperatures were approximately the same as in combustor 3. The other operating conditions in combustor 1 were like those given for combustor 3.

Emission Index values, and other data, from said test condition 18 in the test runs for each of said combustors 1 and 3 are set forth in Table III below. Properties of the fuel used in said test runs are set forth in Table I below. Design details of said combustors are set forth in Table II below. Combustor 3 was like the combustor illustrated in FIG. 1. Combustor 1 was like the combustor illustrated in FIG. 1 except that fins 40 and 42, boss member 44, inlet conduits 36, and wall member 34 were omitted.

EXAMPLE II

A series of test runs was made to evaluate the performance of combustor number 2 using heated air to the primary combustion zone in a manner similar to that described above in Example I. Exhaust gases from the combustor when operating at each of 26 different test conditions were analyzed and Emission Index data obtained, as described above in Example I. At the selected representative test condition the operating conditions were: inlet air pressure, 150 in. Hg abs.; primary air inlet temperature, 1200° F.; cold flow reference velocity, 100 ft. per second; heat input, 200 Btu per pound of air; combustor outlet temperature (estimated), 1900° F.; total air flow, 1.060 pounds per second; and fuel flow, 40.8 pounds per hour.

Emission index values, and other data, from said representative test run are set forth in Table III below. The fuel used was the same as in Example I. Said combustor 2 was like the combustor illustrated in FIG. 1 except that openings 37 in wall member 34 were omitted. Design details of said combustor 2 are given in Table II below.

EXAMPLE III

A series of test runs was made to evaluate the performance of combustor number 4 when using 2.5 volume percent (based on total air to the combustor) of unheated air in the primary combustion zone. Said test runs were carried out at 18 different test conditions in a manner similar to that set forth in Example I above. In each of said test runs the unheated air flow to the primary combustion zone of the combustor was metered at a value within the range of from 0.026 to 0.048 pounds per second, and the heated air to the combustor was fixed at a value within the range of from 1.016 to 1.871 pounds per second, for a total air flow within the range of from 1.042 to 1.919 feet per second. The combustor exhaust gases were analyzed and Emission Index data obtained as in Example I. At the selected representative test condition 18 the specific operating conditions were: inlet air pressure, 130 in. Hg abs.; temperature of unheated air to primary zone, 420° F.; temperature of air to secondary zone, 1245° F.; temperature of air to the quench zone, 1310° F.; cold flow reference velocity, 190 ft. per second; heat input, 200 Btu per pound of air; total air flow, 1.694 pounds per second; unheated air flow, 0.042 pounds per second; heated air flow, 1.652 pounds per second; and fuel flow, 65.33 pounds per hour.

Emission Index values, and other data, from said representative test run are set forth in Table III below. The fuel used was the same as in Example I. Said combustor 4 was like the combustor illustrated in FIG. 6 of the drawings. Design details of said combustor 4 are set forth in Table II below.

EXAMPLE IV

A series of test runs was made to evaluate the performance of combustors 5, 6, and 7 when using 5 volume percent (based on total air to the combustor) of unheated air in the primary combustion zone. Said test runs were carried out at 18 different test conditions in a manner similar to that set forth in Examples I and III above. In each run the unheated air flow to the primary zone of the combustor was metered at a value within the range of from 0.052 to 0.096 pounds per second, and the heated air to the combustor was fixed at a value within the range of from 0.990 to 1.823 pounds per second, for a total air flow within the range of from 1.042 to 1.919 pounds per second. The exhaust gases from the combustors were analyzed and Emission Index data obtained as in Example I. The specific operating conditions in the selected representative test condition 18 were approximately the same as given above for combustor 4 in Example III.

Emission Index values, and other data, from said representative test run are set forth in Table III below. The fuel used was the same as in Example I. Said combustor 5 was like combustor 4, i.e., the combustor illustrated in FIG. 6 of the drawings, except for the larger size of the openings 31 in the radiation shield 36 so as to accommodate the increased volume of primary air admitted through closure member 14. Said combustor 6 was like said combustor 5 except for the provision of 16 openings 37 (½ in. in diameter) in wall member 34 instead of the 8 openings 37 (½ in. diameter) in wall member 34 of combustor 5. Said combustor 7 was like said combustor 5 except that in combustor 7 the flame tube did not have fins 40 and 42 on the outer wall of the flame tube in the primary combustion region thereof. See FIG. 8. Design details of said combustors 5, 6, and 7 are set forth in Table II below.

TABLE I

PROPERTIES OF TEST FUEL

| | Philjet A-50 |
|---|---|
| ASTM Distillation, °F. | |
| Initial Boiling Point | 340 |
| 5 vol. % evaporated | 359 |
| 10 vol. % evaporated | 362 |
| 20 vol. % evaporated | 371 |
| 30 vol. % evaporated | 376 |
| 40 vol. % evaporated | 387 |
| 50 vol. % evaporated | 398 |
| 60 vol. % evaporated | 409 |
| 70 vol. % evaporated | 424 |
| 80 vol. % evaporated | 442 |
| 90 vol. % evaporated | 461 |
| 95 vol. % evaporated | 474 |
| End Point | 496 |
| Residue, vol. % | 0.8 |
| Loss, vol. % | 0.0 |
| Gravity, degrees API | 46.6 |
| Density, lbs./gal. | 6.615 |
| Heat of Combustion, net, Btu/lb. | 18,670 |
| Hydrogen Content, wt. % | 14.2 |
| Smoke Point, mm | 27.2 |
| Sulfur, wt. % | 0.001 |
| Gum, mg/100 ml | 0.0 |
| Composition, vol. % | |
| Paraffins | 52.8 |
| Cycloparaffins | 34.5 |
| Olefins | 0.1 |
| Aromatics | 12.6 |
| Formula (calculated) | ($C_{11}H_{22}$) |
| Stoichiometric Fuel/Air Ratio, lb./lb. | 0.0676 |

TABLE II

COMBUSTOR DESIGN

| Variable | Combustor Number 1 | 2 | 3 | 4 |
|---|---|---|---|---|
| Closure Member | | | | |
| Air Inlet-Type | Tangent | Tangent | Tangent | Tangent |
| Hole Diameter, in. | 0.250 | 0.250 | 0.250 | 0.250 |
| Number of Holes | 6 | 6 | 6 | 6 |
| Total Hole Area, sq. in. | 0.295 | 0.295 | 0.295 | 0.295 |
| Fuel Nozzle Type | Simplex | Simplex | Simplex | Simplex |
| Spray Angle, deg. | 45 | 45 | 45 | 45 |
| Radiation Shield-Type | Orifice | Orifice | Orifice | Orifice |
| Hole Diameter, in. | 0.625 | 0.625 | 0.625 | 0.625 |
| Nozzle Annulus Area, sq. in. | 0.157 | 0.157 | 0.157 | 0.157 |
| % Total Combustor Hole Area | 1.287 | 2.792 | 2.182 | 2.182 |
| Flame-Tube | | | | |
| 1st Station-Diameter, in. | 2.067 | 2.067 | 2.067 | 2.067 |
| Length from Fuel Inlet, in. | 7.250 | 7.250 | 7.250 | 7.250 |
| Hole Diameter, in. | 0.313X1 | 0.313X1 | 0.313X1 | 0.313X1 |
| Number of Holes | 8 | 8 | 8 | 8 |
| Total Hole Area, sq. in. | 2.500 | 2.500 | 2.500 | 2.500 |
| % Total Combustor Hole Area | 20.503 | 44.468 | 34.760 | 34.760 |
| 2nd Station-Diameter, in. | 4.026 | 3.312* | 3.312* | 3.312* |
| Length from Fuel Inlet, in. | 18.000 | 8.000 | 8.000 | 8.000 |
| Hole Diameter, in. | 0.75X1.75 | 0.687 | 0.687 | 0.687 |
| Number of Holes | 8 | 8 | 8 | 8 |
| Total Hole Area, sq. in. | 9.536 | 2.965 | 2.965 | 2.965 |
| % Total Combustor Hole Area | 78.208 | 52.739 | 41.226 | 41.226 |
| 3rd Station-Diameter, in. | — | 4.026 | 5.000* | 5.000* |
| Length from Fuel Inlet, in. | — | 18.000 | 8.000 | 8.000 |
| Hole Diameter, in. | — | 0.75X1.75 | 0.500 | 0.500 |
| Number of Holes | — | 8 | 8 | 8 |
| Total Hole Area, sq. in. | — | 9.536 | 1.570 | 1.570 |
| % Total Combustor Hole Area | — | — | 21.829 | 21.829 |
| 4th Station-Diameter, in. | — | — | 4.026 | 4.026 |
| Length from Fuel Inlet, in. | — | — | 18.000 | 18.000 |
| Hole Diameter, in. | — | — | 0.75X1.75 | 0.75X1.75 |
| Number of Holes | — | — | 8 | 8 |
| Total Hole Area, sq. in. | — | — | 9.536 | 9.536 |
| % Total Combustor Hole Area | — | — | — | — |
| Total Combustor Length, in. | 20.875 | 20.875 | 20.875 | 20.875 |
| Primary Zone, in. | 7.250 | 7.250 | 7.250 | 7.250 |

TABLE II-continued

COMBUSTOR DESIGN

| Variable | Combustor Number 1 | 2 | 3 | 4 |
|---|---|---|---|---|
| Secondary Zone, in. | 10.750 | 10.750 | 10.750 | 10.750 |
| Total Combustor Volume, cu. in. | 197.778 | 197.778 | 197.778 | 197.778 |
| Primary Zone, cu. in. | 24.331 | 24.331 | 24.331 | 24.331 |
| Secondary Zone, cu. in. | 136.848 | 136.848 | 136.848 | 136.848 |
| Total Combustor Hole Area, sq. in. | 12.193 | 5.622 | 7.192 | 7.192 |
| % Combustor Exit Area | 95.781 | 44.163 | 56.496 | 56.496 |

| | Combustor Number 5 | 6 | 7 |
|---|---|---|---|
| Closure Member | | | |
| Air Inlet-Type | Tangent | Tangent | Tangent |
| Hole Diameter, in. | 0.313 | 0.313 | 0.313 |
| Number of Holes | 6 | 6 | 6 |
| Total Hole Area, sq. in. | 0.460 | 0.460 | 0.460 |
| Fuel Nozzle-Type | Simplex | Simplex | Simplex |
| Spray Angle, deg. | 45 | 45 | 45 |
| Radiation Shield Type | Orifice | Orifice | Orifice |
| Hole Diameter, in. | 0.750 | 0.750 | 0.750 |
| Nozzle Annulus Area, sq. in. | 0.292 | 0.292 | 0.292 |
| % Total Combustor Hole Area | 3.985 | 2.270 | 3.985 |
| Flame Tube | | | |
| 1st Station-Diameter, in. | 2.067 | 2.067 | 2.067 |
| Length from Fuel Inlet, in. | 7.250 | 7.250 | 7.250 |
| Hole Diameter, in. | 0.313X1 | 0.313X1 | 0.313X1 |
| Number of Holes | 8 | 8 | 8 |
| Total Hole Area, sq. in. | 2.500 | 2.500 | 2.500 |
| % Total Combustor Hole Area | 34.120 | 28.099 | 34.120 |
| 2nd Station-Diameter, in. | 3.312* | 3.312* | 3.312* |
| Length from Fuel Inlet, in. | 8.000 | 8.000 | 8.000 |
| Hole Diameter, in. | 0.687 | 0.687 | 0.687 |
| Number of Holes | 8 | 8 | 8 |
| Total Hole Area, sq. in. | 2.965 | 2.965 | 2.965 |
| % Total Combustor Hole Area | 40.466 | 33.325 | 40.466 |
| 3rd Station-Diameter, in. | 5.000* | 5.000* | 5.000* |
| Length from Fuel Inlet, in. | 8.000 | 8.000 | 8.000 |
| Hole Diameter, in. | 0.500 | 0.500 | 0.500 |
| Number of Holes | 8 | 16 | 8 |
| Total Hole Area, sq. in. | 1.570 | 3.140 | 1.570 |
| % Total Combustor Hole Area | 21.427 | 35.292 | 21.427 |
| 4th Station-Diameter, in. | 4.026 | 4.026 | 4.026 |
| Length from Fuel Inlet, in. | 18.000 | 18.000 | 18.000 |
| Hole Diameter, in. | 0.75X1.75 | 0.75X1.75 | 0.75X1.75 |
| Number of Holes | 8 | 8 | 8 |
| Total Hole Area, sq. in. | 9.536 | 9.536 | 9.536 |
| % Total Combustor Hole Area | — | — | — |
| Total Combustor Length, in. | 20.875 | 20.875 | 20.875 |
| Primary Zone, in. | 7.250 | 7.250 | 7.250 |
| Secondary Zone, in. | 10.750 | 10.750 | 10.750 |
| Total Combustor Volume, cu. in. | 197.778 | 197.778 | 197.778 |
| Primary Zone, cu. in. | 24.331 | 24.331 | 24.331 |
| Secondary Zone, cu. in | 136.848 | 136.848 | 136.848 |
| Total Combustor Hole Area, sq. in. | 7.327 | 8.897 | 7.327 |
| % Combustor Exit Area | 57.566 | 69.890 | 57.566 |

*Station Divider

TABLE II

COMBUSTOR PERFORMANCE

| Example No. | Comb. No. | Air to Primary Zone % | Temp.°F | Air to Sec. Zone %(c) | Temp.°F | Air to Quench Zone %(c) | Temp.°F. | Emission Index lbs. Pollutant/1000 lbs. fuel NO$_x$ | CO | HC |
|---|---|---|---|---|---|---|---|---|---|---|
| I | 1 | 1.3$^c$ | 1250$^a$ | 20.5 | 1250$^b$ | 78.2 | 1250$^b$ | 44.80 | 1.98 | 0.0 |
| I | 3 | 2.2$^c$ | 1195 | 34.8 | 1235 | 63.0$^e$ | 1320 | 8.62 | 1.14 | 0.0 |
| II | 2 | 2.8$^c$ | 1200$^b$ | 44.5 | 1200$^b$ | 52.7$^f$ | 1200$^b$ | 5.5 | 4.7 | 0.0 |
| III | 4 | 2.5$^d$ | 420 | 34.6 | 1245 | 62.9$^e$ | 1310 | 4.57 | 1.07 | 0.0 |
| IV | 5 | 5.0$^d$ | 420$^b$ | 33.8 | 1245$^b$ | 61.2$^e$ | 1310$^b$ | 3.45 | 1.23 | 0.0 |
| IV | 6 | 5.0$^d$ | 420$^b$ | 27.6 | 1245$^b$ | 67.4$^e$ | 1310$^b$ | 5.69 | 1.14 | 0.04 |
| IV | 7 | 5.0$^d$ | 420$^b$ | 33.8 | 1245$^b$ | 61.2$^e$ | 1310$^b$ | 7.20 | 1.23 | 0.0 |

$^a$measured at air heater outlet
$^b$approximate
$^c$% of total air flow, based on open hole area in flame tube
$^d$metered
$^e$total of air passing through annular space 18 and through openings 37, and the air passing over fins 40 in enclosed annular space 18' and then through openings 46
$^f$air passing over fins 40 in enclosed annular space 18' and then through openings 46

Referring to the above Table III, and comparing the results obtained with combustors 1 and 3, clearly shows the benefits obtained when removing heat from the primary combustion zone by heat exchange. In control combustor 1, over 98 percent of the total air to the combustor passed over the smooth outer wall of the primary combustion zone. The NO$_x$ Emission Index was 44.80. In combustor 3, approximately 41 percent of the total air to the combustor was passed through the enclosed annular space 18' and over the extended outer surface (fins 40) of the primary combustion zone to remove heat from said primary zone, and the $NO_x$ Emission Index was reduced to 8.62.

Comparing said results obtained with combustor 3 with the results obtained with combustor 2, where approximately 53 percent of the total air to the combustor was passed through said enclosed annular space 18' and over the extended outer surface (fins 40) on the outer wall of the primary combustion zone to remove heat therefrom, it will be noted that the $NO_x$ Emission Index was further reduced to 5.5 in said combustor 2 by increasing the heat removal from said primary zone.

Comparing the results obtained with combustor 4, with said results obtained with combustor 3 (approximately 41 percent of the total air passed over said fins 40 in both combustors), shows the advantage of using unheated air in the primary combustion zone of the combustor along with heat removal from said zone. Decreasing the temperature of the air to the primary combustion zone from 1195° F. in combustor 3 to 420° F. in combustor 4 reduced the $NO_x$ Emission Index from 5.5 to 4.57, a significant further reduction.

Comparing the results obtained with combustor 5 (approximately 40 percent of the total air over said fins 40) with said results obtained with combustor 4 (approximately 41 percent of the total air over said fins 40) shows that increasing the amount of said unheated air from 2.5 percent in combustor 4 to 5.0 percent in combustor 5 further reduced the $NO_x$ Emission Index from 4.57 in combustor 4 to 3.45 in combustor 5, a significant further reduction.

Comparing the results obtained with combustor 7 with said results obtained in combustor 5, where the same amount of unheated primary air was used in the primary combustion zone of both combustors, shows that the absence of fins 40 from the flame tube wall in combustor 7 caused the $NO_x$ Emission Index to increase from 3.45 in combustor 5 to 7.20 in combustor 7, a significant increase.

Comparing the results obtained with said combustors 5 and 6 (same amount of unheated air in the primary zone) shows that decreasing the amount of air being passed over said fins 40 from about 40 percent in combustor 5 to about 33 percent in combustor 6 causes the $NO_x$ Emission Index to increase from 3.45 in combustor 5 to 5.69 in combustor 6, a significant increase. Said decrease in the amount of air over fins 40 in combustor 6 was caused by providing 16 openings 37 in wall member 34 of combustor 6, compared with 8 openings 37 in wall member 34 of combustor 5.

The above data show that the use of unheated air in the primary combustion zone, and the removal of heat from the primary combustion zone, are cumulative in reducing $NO_x$ emissions. Thus, in the most preferred embodiments of the invention, a combination of unheated air to the primary combustion zone plus the removal of heat from said primary combustion zone by heat exchange with the outer wall thereof is preferred with the desired $NO_x$ Emission Index value being 37 balanced" against the desired reduction in combustor pressure drop.

It is within the scope of the invention to operate the combustors of the invention under any conditions which give the improved results of the invention. For example, it is within the scope of the invention to operate said combustors at inlet air temperatures within the range of from ambient temperatures or lower to about 1500° F. or higher; at combustor pressures within the range of from about 1 to about 40 atmospheres or higher; at flow velocities within the range of from about 1 to about 500 ft. per second or higher; and at heat input rates within the range of from about 30 to about 1200 Btu per pound of air. Generally speaking, operating conditions in the combustors of the invention will depend upon where the combustor is employed. For example, when the combustor is employed with a high pressure turbine, higher pressures and higher inlet air temperatures will be employed in the combustor. Thus, the invention is not limited to any particular operating conditions. As a further guide to those skilled in the art, but not to be considered as limiting on the invention, presently preferred operating ranges for other variables or parameters are: heat input, from 30 to 500 Btu per lb. of total air to the combustor; combustor pressure, from 3 to 10 atmospheres; and reference air velocity, from 50 to 250 feet per second.

The relative volumes of the above-described first, second, and third streams of air will depend upon the other operating conditions. Generally speaking, the combined volume of said first stream of air comprising primary air and said second stream of air comprising secondary air will usually be a minor proportion of the total air to the combustor, e.g., less than about 50 volume percent, with said first stream of air being in the range of up to about 25 volume percent. The volume of said third stream of air comprising quench air will usually be a major portion of the total air to the combustor, e.g., more than about 50 volume percent.

The data set forth in the above Table III show that the combustors of the invention can be operated in accordance with the invention to give low $NO_x$, low CO, and low HC emissions when using an atomized liquid fuel. It is also within the scope of the invention to use a prevaporized fuel. The various operating variables or parameters utilized in the practice of the invention are interrelated. Thus, a change in one variable or parameter may make it desirable to adjust one or more of the other operating variables or parameters in order to obtain desirable results with respect to all three pollutants $NO_x$, CO, and HC (hydrocarbons).

In presently preferred methods of the invention, the primary combustion zone or section is preferably operated fuel-rich with respect to the primary air admitted thereto. Thus, the equivalence ratio in the primary combustion zone is preferably greater than stoichiometric. In this method of operation, the second zone (secondary combustion zone) or section of the combustor is preferably operated fuel-lean with respect to any unburned fuel and air entering said second zone from said primary zone, and any additional air admitted to said second zone. Thus, the equivalence ratio in said second zone preferably is less than stoichiometric. This method of operation is preferred when it is desired to obtain both low $NO_x$ and low CO emissions from a combustor. In general, it is preferred that the transition from the fuel-rich condition in the primary combustion zone to the fuel-lean condition in the secondary zone be sharp or rapid, e.g., be effected as quickly as possible. While it is presently preferred that the primary combustion zone be operated fuel-rich as described, it is within the scope of the invention to operate the primary combustion zone fuel-lean. Thus, it is within the scope of the invention to operate the primary combustion zone with any equivalence ratio which will give the improved results of the invention.

As used herein and in the claims, unless otherwise specified, the term "equivalence ratio" for a particular zone is defined as the ratio of the fuel flow (fuel available) to the fuel required for stoichiometric combustion with the air available. Stated another way, said equivalence ratio is the ratio of the actual fuel-air mixture to the stoichiometric fuel-air mixture. For example, an equivalence ratio of 2 means the fuel-air mixture in the zone is fuel-rich and contains twice as much fuel as a stoichiometric mixture.

The data in the above examples show that the temperature of the inlet air to the primary combustion zone or region can be an important operating variable or parameter in the practice of the methods of the invention. As stated above, the invention is not limited to any particular range or value for said inlet air temperature. It is within the scope of the invention to use any primary air inlet temperature which will give the improved results of the invention. For example, from ambient or atmospheric temperatures up to about 1500° F. or higher. However, considering presently available practical materials of construction, about 1200° F. to about 1500° F. is a practical upper limit for said primary air inlet temperature in most instances. Considering other practical aspects, such as not having to cool the compressor discharge stream, about 200° to 400° F. is a practical lower limit for said primary air inlet temperature in many instances. However, it is emphasized that primary air inlet temperatures lower than 200° F. can be used, e.g., in low compression ratio combustors.

The temperature of the air admitted to the second zone or region of the combustor (secondary air) can also be an important operating variable or parameter, particularly when the lower primary air inlet temperatures are used, and it is desired to obtain low CO emission values as well as low $NO_x$ emission values. Said data show that both low $NO_x$ emission values and low CO emission values can be obtained when the temperature of the inlet air to both the primary combustion zone and the secondary combustion zone of the combustor are above about 1100° F. As the temperature of the inlet air to said zones decreases, increasingly improved (lower) values for $NO_x$ emissions will be obtained, but it becomes more difficult to obtain desirably low CO emission values. In some instances, it is preferred that the temperature of the inlet air to the primary combustion zone not be greater than about 700° F., e.g., from ambient to about 700° F., more preferably from ambient to about 500° F. Thus, in some embodiments of the invention, it is preferred that the temperature of the air admitted to the secondary combustion zone of the combustor be greater than the temperature of the primary air admitted to the primary combustion zone. For example, in such instances, depending upon the temperature of the inlet air to the primary combustion zone, it is preferred that the temperature of the inlet air to the secondary zone be in the range of from at least about 100° to about 1200° F., more preferably at least about 200° F. greater than the temperature of said inlet primary air. Any suitable means can be employed for heating said secondary air. The temperature of the dilution or quench air can be any suitable temperature depending upon materials of construction in the equipment employed downstream from the combustor, e.g., turbine blades, and how much it is desired to cool and/or dilute the combustor effluent.

In conventional operation of conventional combustors of the prior art, all of the air supplied to the combustor is heated, usually to a temperature in the order of 1000° F., or greater. In preferred embodiments of the present invention a stream of "unheated air" is supplied to the primary combustion zone or section. Said "unheated air" can have a temperature greater than ambient temperatures. For example, the air from the discharge of a compressor, if not cooled, will usually have a temperature greater than ambient temperatures. Such a stream would be "unheated air" as the term is used herein. Thus, as used herein, said term "unheated air" refers to air which has not been intentionally heated. The temperature of said "unheated air" will usually be less than about 700° F., preferably less than about 500° F.

The term "air" is employed generically herein and in the claims, for convenience, to include air and other combustion-supporting gases.

The Emission Index values referred to herein were related to the various governmental agencies' standards by assuming that the vehicle in which the gas turbine engine is employed will obtain a fuel economy of 10.0 miles per gallon of fuel, and using a fuel weight of 6.352 pounds per gallon.

No adjustment has been made for the relatively dry inlet air used in the test runs (about 0.002 lbs. $H_2O$ per pound of dry air). Therefore, a multiplicative correction factor in the order of about 0.85 could be applied to the $NO_x$ values reported herein.

While the invention has been described, in some instances, with particular reference to combustors employed in combination with gas turbine engines, the invention is not limited thereto. The combustors of the invention have utility in other applications, e.g., boilers, other stationary power plants, etc.

Thus, while certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A combustor comprising, in combination:
   an outer casing;
   a flame tube disposed within said casing and spaced apart therefrom to form a first annular chamber between said flame tube and said casing;
   an air inlet means for introducing a first stream of air into the upstream end portion of said flame tube;
   a fuel inlet means for introducing fuel into the upstream end portion of said flame tube;
   an imperforate sleeve surrounding an upstream portion of said flame tube and spaced apart therefrom to longitudinally enclose an upstream portion of said first annular chamber and define a second annular chamber between said sleeve and said outer casing;
   means for supporting said sleeve in said spaced apart position from said flame tube;
   a wall member secured to said outer casing and substantially closing the downstream end of said second annular chamber;
   at least one opening provided in the wall of said flame tube at a first station located intermediate the upstream and downstream ends thereof;

first conduit means extending from said second annular chamber into communication with said opening located at said first station for admitting a second stream of air from said second annular chamber into the interior of said flame tube;

at least one other opening provided in the wall of said flame tube at a second station located downstream from said first station for admitting a third stream of air from said first annular chamber into the interior of said flame tube; and at least one opening provided in said wall member for providing communication between said second annular chamber and the portion of said first annular chamber downstream therefrom.

2. A combustor according to claim 1 wherein heat exchange fins are mounted on the outer wall surface of said flame tube, in the region surrounded by said sleeve, and extend into the portion of said first annular chamber enclosed by said sleeve.

3. A combustor according to claim 2 wherein:
a dome member is mounted in the upstream end of said flame tube; and
said air inlet means comprises a generally cylindrical swirl chamber formed in said dome member, the downstream end of said swirl chamber being in communication with the upstream end portion of said flame tube for introducing a swirling stream of air into said flame tube, and conduit means formed in said dome member for introducing air into said swirl chamber.

4. A combustor according to claim 3 wherein said fuel inlet means comprises conduit means for introducing said fuel axially with respect to said swirling stream of air.

5. A combustor according to claim 4 wherein the downstream end portion of said dome member comprises an expansion passageway which flares outwardly from an opening in the downstream end of said swirl chamber to the inner wall of said flame tube.

6. A combustor according to claim 3 wherein a conduit is connected to said dome member and is in communication with said conduit means formed in said dome member for maintaining and introducing said first stream of air separate from said second and third streams of air.

7. A combustor according to claim 1 wherein:
a dome member is mounted in the upstream end of said flame tube; and
said air inlet means comprises a generally cylindrical swirl chamber formed in said dome member, the downstream end of said swirl chamber being in open communication with the upstream end portion of said flame tube, and conduit means formed in said dome member for introducing a swirling stream of air into said swirl chamber.

8. A combustor according to claim 7 wherein a conduit is connected to said dome member and is in communication with said conduit means formed in said dome member for maintaining and introducing said first stream of air separate from said second and third streams of air.

9. A combustor according to claim 1 wherein:
a boss member surrounds said flame tube at the downstream end of said portion of said first annular chamber enclosed by said sleeve;
at least one passageway extends longitudinally through said boss member and provides communication between said enclosed portion of said first annular chamber and the downstream portion of said first annular chamber; and
said wall member extends from said outer casing to said boss member.

10. A combustor according to claim 9 wherein:
said opening provided in said flame tube at said first station comprises a plurality of openings spaced around the periphery of said flame tube; and
said first conduit means comprises a like plurality of individual tubular conduits each extending transversely through said boss member to connect individually to individual openings of said plurality of openings.

11. A combustor according to claim 10 wherein heat exchange fins are mounted on the outer wall surface of said flame tube, in the region surrounded by said sleeve, and extend into the portion of said first annular chamber enclosed by said sleeve.

12. A combustor according to claim 11 wherein:
a dome member is mounted in the upstream end of said flame tube; and
said air inlet means comprises a generally cylindrical swirl chamber formed in said dome member, the downstream end of said swirl chamber being in open communication with the upstream end portion of said flame tube, and conduit means formed in said dome member for introducing a swirling stream of air into said swirl chamber.

13. A combustor according to claim 12 wherein a conduit is connected to said dome member for maintaining and introducing said first stream of air separate from said second and third streams of air.

14. A combustor according to claim 1 wherein:
said flame tube comprises an upstream primary combustion section, an intermediate secondary combustion section of greater cross-sectional area than said primary combustion section, and a downstream quench or dilution section;
said imperforate sleeve surrounds said primary combustion section; and
an imperforate annular connecting section of greater cross-sectional area than said primary combustion section is disposed between said primary combustion section and said secondary combustion section and comprises the upstream end portion of said secondary combustion section.

15. A combustor according to claim 14 wherein said annular connecting section tapers in increasing cross-sectional area from the cross-sectional area of said primary combustion section to said greater cross-sectional area of said secondary combustion section.

* * * * *